UNITED STATES PATENT OFFICE

CARLISLE K. ROOS, OF CHICAGO, ILLINOIS, ASSIGNOR TO UNITED STATES GYPSUM COMPANY, OF CHICAGO, ILLINOIS, A CORPORATION OF ILLINOIS

ACOUSTIC PLASTER

No Drawing. Application filed February 7, 1927. Serial No. 166,600.

This invention relates to building material but more particularly to a special plaster which may be applied to walls or ceilings by means of ordinary plastering tools and which when so applied has the property of absorbing sound to a greater degree than ordinary wall plasters.

Heretofore it has not been found practical to produce sound absorbing plaster which could be applied by the ordinary plastering tools using calcined gypsum as the cementitious base. The gypsum used has been the well known plaster of Paris, calcined at 330 degrees Fahrenheit and commonly known as first settle stucco. This product is the most plastic of all the commercial forms of calcined gypsum and accordingly has been used as a base for all gypsum wall plasters. Due to its high plasticity it will work plastic with high additions of aggregate and large amount of water for gauging purposes. When sufficient quantities of the aggregates have been used with this type of cementitious base, sufficient to form a cellular sound absorbing wall plaster, the resultant product has lacked the strength and hardness necessary for a good wall finish.

It is the object of this invention to produce a sound absorbing wall plaster which can be readily applied to walls or ceilings by the ordinary plastering tools using calcined gypsum as the cementitious base.

It has been found that a special calcined gypsum or aridized stucco (made according to Brookby Patent No. 1,370,581) is particularly well adapted to use as a base for sound absorbing plaster, giving a gypsum sound absorbing wall plaster of proper porosity and strength. This calcined gypsum is well suited for the reason that it is much less plastic, requires less water for mixing and has about twice the strength of the usual first settle calcined gypsum. While this special calcined gypsum is preferred other calcined gypsum bases may be used. These are the low consistency gypsum plasters such as Keene's cement, second settle calcined gypsum and first settle calcined gypsum aged in storage for a period of several months.

The production of acoustic plaster by this method entails only the dry mixing, in the ordinary plaster mixer, of the calcined gypsum together with the aggregate and an air entraining agent. The best results have been obtained using the following formulæ:

Formula No. 1

| | |
|---|---|
| No. 5 stucco | 500 pounds |
| No. 4 quartz silica | 250 pounds |
| No. 7 quartz silica | 250 pounds |
| Mixed pumice | 600 pounds |
| Retarder | 1 pound 8 ounces |
| Powdered soap bark | 9 ounces |

Formula No. 2

| | |
|---|---|
| No. 5 stucco | 500 pounds |
| Mixed pumice | 550–600 pounds |
| Crushed marble | 500 pounds |
| Retarder | 20 ounces |
| Powdered soap bark | 8 ounces |

The No. 5 stucco is air separated calcined gypsum made according to the Brookby Patent #1,370,581; the No. 4 quartz silica is a non-porous aggregate weighing approximately 84 pounds per cubic foot having a sieve analysis of 18% on 20 mesh, 95% on 30 mesh and 99.5% on 40 mesh; the No. 7 quartz silica weighs approximately 87 pounds per cubic foot and is crushed to a size testing 5% on a 10 mesh and 99% on 20 mesh; the mixed pumice weighs about 40 pounds per cubic foot and has a sieve analysis of 1% on 10 mesh, 31% on 20 mesh, 70% on 30 mesh and 98% on 100 mesh.

Other grades of quartz or pumice may be used, such as No. 5 quartz with an average screen analysis of 1% on 10 mesh, 60% on 20 mesh and 100% on 30 mesh. The coarser aggregate not necessarily closely graded may be used. These need not have sharp projecting points and may be round, but if round they should be graded nearly to one size in order to obtain minimum cubical piling, (see Bancroft Applied Colloid Chemistry). It is preferable that a part of the aggregate be pumice since its use gives a lighter weight mortar mix which will cover greater yardage in the plastering operation. However it may be omitted and quartz used entirely, in which case five parts of quartz aggregate would be used to one part of calcined gypsum. The quartz or the pumice may be replaced by quartzites, feldspar ganister, crushed marble and similar materials. A porous aggregate is not necessary for sound absorption providing the cementitious matrix surrounding the aggregate is porous or cellular. The ideal size for any aggregate is one that will pass a 14 mesh screen and be retained on a 28 mesh screen.

To produce a cellular structure within the cementitious matrix, a gas entrainer is used, preferably a non-retarding gas entrainer. Among those which may be used are those of the saponaceous variety such as ground soap bark, soapberry, Yucca roots, Sapendis nuts or saponin itself.

The bubbles are formed throughout the mortar by the air contained in and on the surface of the particles of calcined gypsum and form the surface air film on the particles of the aggregate. The wetting of the plaster in making up the mortar liberates the air occluded in the calcined gypsum and on the surface of the aggregate. This air is entrained by any of the entrainers mentioned above and forms a light working cellular mortar which on hardening leaves a cellular structure between the aggregate. The surface film of the bubble having saponin on the inter-face is very tenacious and withstands the abrasion of the aggregate. For this reason excessive mixing of the mortar does not cause them to coalesce, but simply breaks them up into a finer cell structure without appreciably impairing the plaster sound absorbing value.

A plaster made according to the formula given above has been tested and shows an average absorption coefficient of 20% for the octave $C_4$ to $C_5$, while the coefficient is 25 to 30 per cent for the octave $C_5$ to $C_6$.

This plaster is sufficiently plastic to be applied in a manner similar to any other wall plaster. Ordinarily a scratch coat of ordinary plaster is applied to the lath, over which is applied two coats of acoustic plaster. The second is applied with a cork float to produce a finish and a rough pitted surface.

Having thus described my invention, what I claim is:

1. A plastic sound-absorbing wall plaster capable of application by trowelling and setting to a porous mass consisting of a mixture of calcined gypsum, water, a graded non-porous aggregate, a graded porous aggregate, a foaming agent of the saponin type and a commercial gypsum-setting retarder.

2. A plastic sound-absorbing wall plaster capable of application by trowelling and setting to a porous mass consisting of a mixture of calcined gypsum, water, graded crushed marble, graded crushed pumice, a foaming agent of the saponin type and a commercial gypsum-setting retarder.

3. A dry mix composition that on gaging with water forms a plastic mortar capable of application by troweling to walls, ceilings and the like and which sets to form an acoustic sound-absorbing plaster surface, consisting of commercial retarded gypsum stucco, a graded sized aggregate, and a foam-producing agent of the saponin type capable of entrapping air bubbles.

4. A dry mix composition that on gaging with water forms a plastic mortar capable of application by troweling to walls, ceilings and the like, and which sets to form an acoustic sound-absorbing plaster surface, consisting of commercial retarded gypsum stucco, a graded sized aggregate and powdered soap bark.

5. A dry mix composition that on gaging with water forms a plastic mortar capable of application by troweling to walls, ceilings and the like and which sets to form an acoustic sound-absorbing plaster surface, consisting of commercial retarded gypsum stucco, a graded aggregate of granulated pumice and granulated marble, and a foam-producing agent of the saponin type capable of entrapping air bubbles.

6. A dry mix composition that on gaging with water forms a plastic mortar capable of application by troweling to walls, ceilings and the like and which sets to form an acoustic sound-absorbing plaster surface, consisting of commercial retarded gypsum stucco, a graded aggregate of granulated pumice and granulated marble, and powdered soap bark.

7. A dry mix composition that on gaging with water forms a plastic mortar capable of application by troweling to walls, ceilings and the like and which sets to form an acoustic sound-absorbing plaster surface, consisting of commercial retarded gypsum stucco, a graded aggregate of granulated marble and pumice sized between 14 and 28 mesh, and a foam-producing agent of the saponin type capable of entrapping air bubbles.

8. A dry mix composition that on gaging with water forms a plastic mortar capable of application by troweling to walls, ceilings and the like and which sets to form an acoustic sound-absorbing plaster surface, consisting of commercial retarded gypsum stucco, a graded aggregate of granulated marble and pumice sized between 14 and 28 mesh, and powdered soap bark.

9. A dry mix composition that on gaging with water forms a plastic mortar capable of application by troweling to walls, ceilings and the like and which sets to form an acoustic sound-absorbing plaster surface consisting of substantially 500 parts of gypsum stucco, 550–600 parts of granulated pumice, 500 parts of granulated marble, 1¼ parts of commercial retarder, and ½ part of powdered soap bark.

10. An acoustic sound-absorbing plaster resulting from the setting of a water-gaged composition consisting of commercial retarded gypsum stucco, a graded sized aggregate, and a foam-producing agent of the saponin type capable of entrapping air bubbles.

11. An acoustic sound-absorbing plaster resulting from the setting of a water-gaged composition consisting of commercial retarded gypsum stucco, a graded sized aggregate, and powdered soap bark.

12. An acoustic sound-absorbing plaster resulting from the setting of a water-gaged composition consisting of commercial retarded gypsum stucco, a graded aggregate of granulated pumice and granulated marble, and a foam-producing agent of the saponin type capable of entrapping air bubbles.

13. An acoustic sound absorbing plaster resulting from the setting of a water-gaged composition consisting of commercial retarded gypsum stucco, a graded aggregate of granulated pumice and granulated marble, and powdered soap bark.

14. An acoustic sound-absorbing plaster resulting from the setting of a water-gaged composition consisting of commercial retarded gypsum stucco, a graded aggregate of granulated marble and pumice sized between 14 and 28 mesh; and a foam-producing agent of the saponin type capable of entrapping air bubbles.

15. An acoustic sound-absorbing plaster resulting from the setting of a water-gaged composition consisting of commercial retarded gypsum stucco, a graded aggregate of granulated marble and pumice sized between 14 and 28 mesh, and powdered soap bark.

16. An acoustic sound-absorbing plaster resulting from the setting of a water-gaged composition consisting of substantially 500 parts of gypsum stucco, 550–600 parts of granulated pumice, 500 parts of granulated marble, $1\frac{1}{4}$ parts of commercial retarder, and $\frac{1}{2}$ part of powdered soap bark.

CARLISLE K. ROOS.